United States Patent [19]

Wetch et al.

[11] 4,127,443
[45] Nov. 28, 1978

[54] COMPACT POWER REACTOR

[75] Inventors: Joseph R. Wetch, Woodland Hills; Herman M. Dieckamp; Lewis A. Wilson, both of Canoga Park, all of Calif.

[73] Assignee: The United States of America as represented by the United States Department of Energy, Washington, D.C.

[21] Appl. No.: 26,904

[22] Filed: May 4, 1960

[51] Int. Cl.$^2$ .......................... G21C 3/42; G21C 7/08
[52] U.S. Cl. ...................................... 176/22; 176/33; 176/69; 176/71
[58] Field of Search .................. 176/22, 33, 36, 50, 176/69

[56] References Cited
U.S. PATENT DOCUMENTS

| | | | |
|---|---|---|---|
| 2,838,452 | 6/1958 | West et al. ........................ | 204/193.2 |
| 2,841,545 | 7/1958 | Zinn .................................. | 204/193.2 |
| 2,852,456 | 9/1958 | Wade ............................ | 204/193.2 R |
| 2,852,458 | 9/1958 | Dietrich et al. ............... | 204/193.2 R |
| 2,879,216 | 3/1959 | Hurwitz, Jr. et al. ............ | 204/193.2 |
| 2,947,678 | 8/1960 | Ginura et al. ..................... | 204/193.2 |
| 2,975,117 | 3/1961 | Zinn .............................. | 204/193.2 R |
| 2,992,982 | 7/1961 | Avery ........................... | 204/193.2 R |

Primary Examiner—Reuben Epstein
Attorney, Agent, or Firm—Dean E. Carlson; Roger S. Gaither; L. E. Carnahan

[57] ABSTRACT

There is disclosed a small compact nuclear reactor operating in the epithermal neutron energy range for supplying power at remote locations, as for a satellite. The core contains fuel moderator elements of Zr hydride with 7 w/o of 93% enriched uranium alloy. The core has a radial beryllium reflector and is cooled by liquid metal coolant such as NaK. The reactor is controlled and shut down by moving portions of the reflector.

8 Claims, 9 Drawing Figures

COMPACT POWER REACTOR

The present invention is directed to nuclear reactors and more particularly to small compact power reactors operating in the epithermal neutron energy range.

The application of nuclear reactors to the problems of supplying power for remote locations is one of increasing importance. Thus, for example, U.S. military installations overseas are well over 100 in number and in size range from small radar and signal stations with power demands of a few hundred kilowatts to large industrial complexes such as major air and naval bases requiring 20 Mw(e) or more. At the present time, diesel or gasoline units supply these bases with the necessary electric power and space heating. For many remote military bases, especially for artic installations, the fossil fuel supply accounts for a majority of the required logistic effort. With nuclear power sources this effort could be drastically reduced. Thus, for each electrical megawatt of installed nuclear power plant capacity, a savings in the logistic support effort of the order of 10,000 barrels of oil could be attained.

Further, with the advent of the space probe and satellite it is increasingly important to have a power supply which will produce power over long periods of time, i.e., many months or years, and which is small, reliable, and capable of completely unattended operation for such long periods of time. The present invention is directed specifically to this latter problem but, with suitable increase in size, is equally applicable to larger power plant installations for remote locations.

It is, therefore, an object of the present invention to provide a small, compact, reliable, nuclear reactor capable of producing power for substantial lengths of time.

It is a further object of the present invention to provide a small, compact, reliable, power-producing nuclear reactor capable of withstanding the large acceleration required in satellite launchings.

It is another object of the present invention to provide a small, compact, reliable, power-producing nuclear reactor for use in supplying power for the electrical equipment of a satellite.

It is another object of the present invention to provide an epithermal nuclear reactor capable of delivering at least 50 kw thermal power with a core weight less than 250 pounds which will operate for at least 1 year unattended.

It is another object of the present invention to provide a power-producing nuclear reactor which is capable of withstanding the shocks and vibrations of a missile launch, will operate automatically, and will not present a radiation hazard.

It is another object of the present invention to provide a small, compact nuclear power supply operating at high temperatures, weighing only a few hundred pounds and capable of generating sufficient heat for the production of several kilowatts of electrical power for a space vehicle.

It is another object of the present invention to provide a small, compact epithermal nuclear reactor power supply operating at high temperatures capable of self-controlled operation in outer space.

These and other objects of the present invention will be more apparent from the following description of the preferred embodiment shown in the drawings, hereby made a part of the specification, in which.

TABLE I

REACTOR CORE CHARACTERISTICS OF PREFERRED EMBODIMENT

| | |
|---|---|
| Fuel (Zr-U)H$_{1.7}$ | homogeneous mixture 93.12 w/o ZrH$_{1.7}$ and 6.88 w/o U |
| No. of fuel elements | 61 |
| Size of fuel elements | 1" diameter × 10" long |
| Fuel inventory | 2.7 kg U-235 |
| Reflector | 2 – 3" Beryllium |
| Coolant | NaK eutectic |
| Inlet temperature | 1000° F |
| Outlet temperature | 1200° F |
| Control | reflector drums |
| Core size (hexagonal parallel piped) | 8" across flats × 10" long |
| Weight (reactor) | 220 lbs. |
| Overall dimensions (reactor) | 13" diameter × 16-18" long |
| Fuel properties | |
| $N_H$ (Hydrogen atoms/cm$^3$ at 1200° F) | $6.1 \times 10^{22}$ atoms/cm$^3$ |
| $N_H$ (Hydrogen atoms/cm$^3$ at ambient) | $6.25 \times 10^{22}$ atoms/cm$^3$ |
| K (1200° F) | $13.0 \pm 1.0$ Btu/hr-ft-° F |
| E (80° F) | $9.1 \times 10^6$ psi |
| (1200° F) | $4.4 \times 10^6$ psi |
| UTS (80° F) | 8000 psi |
| (1200° F) | 10,000 psi |
| Coefficient of linear expansion (1200° F) | $6.56 \times 10^{-6}$ in/in-° F |
| Power density | 0.156 Mw/ft$^3$ |
| Temperature coefficient (at operating temperature) | $-3.5 \times 10^{-5} \Delta K/K/°$ C |

Figure 1:
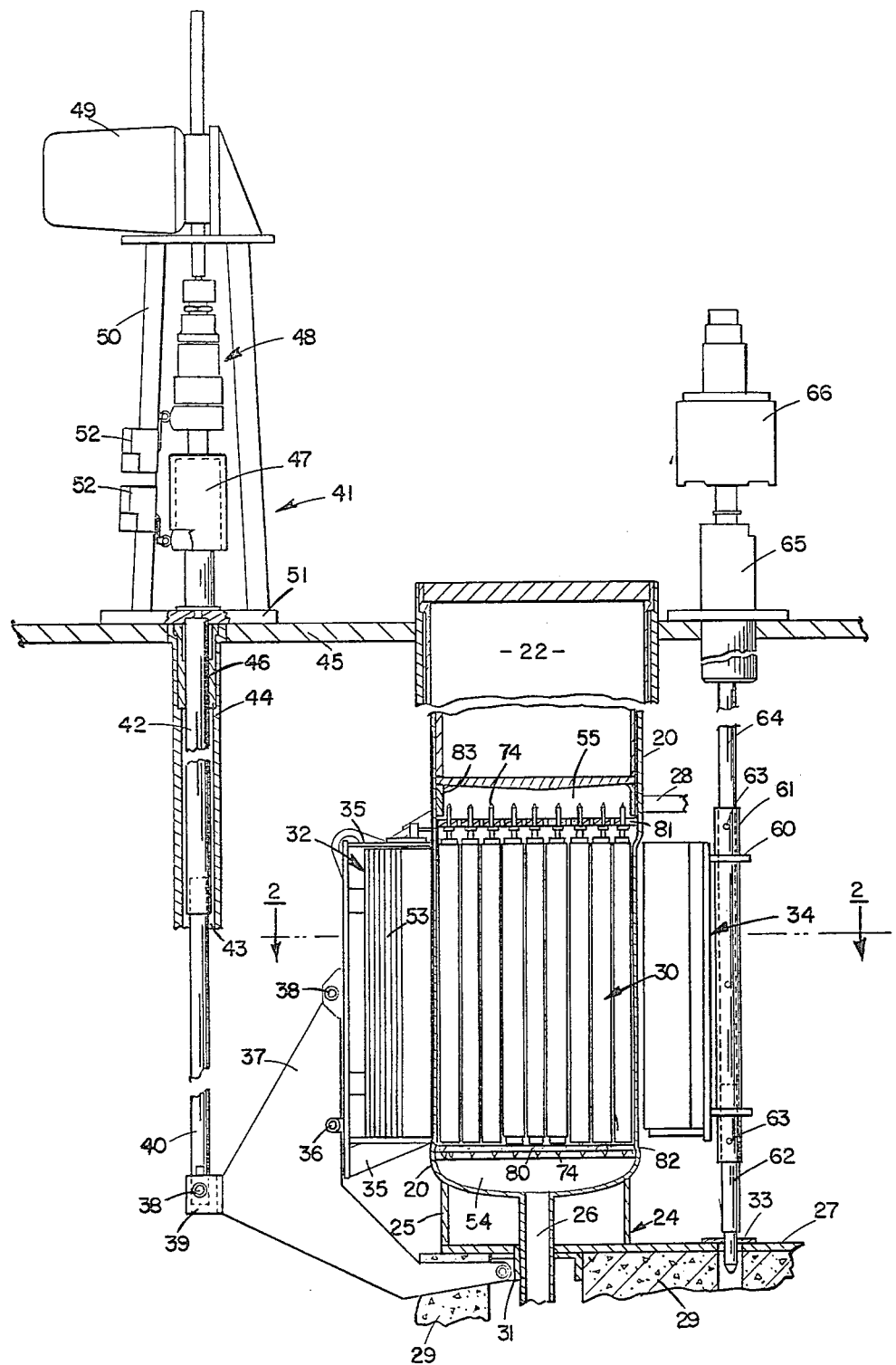
FIG. 1 is a sectional view of one embodiment of the present invention.
Figure 2:
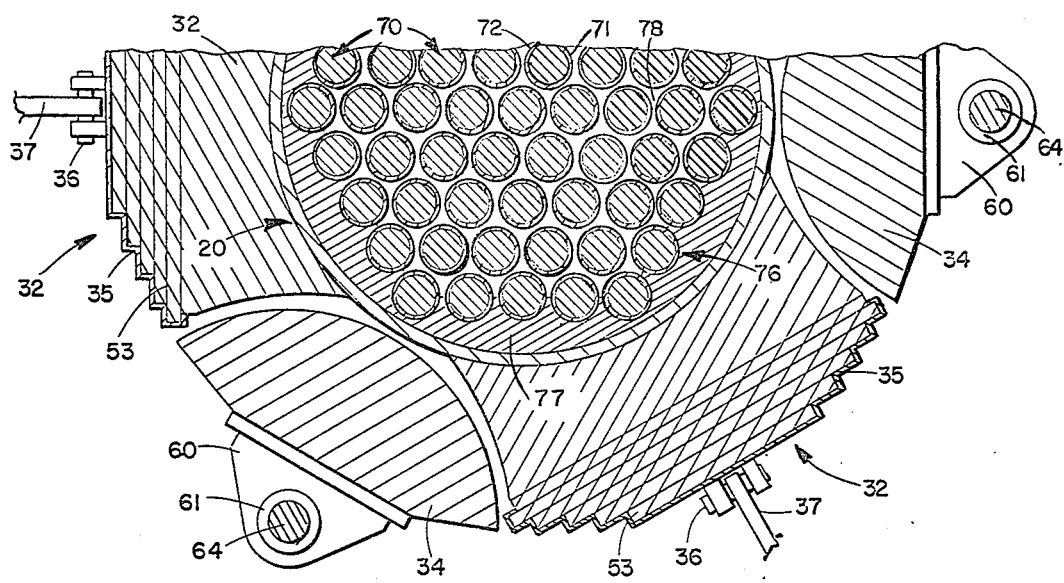
FIG. 2 is a cross-sectional view of FIG. 1 showing the radial reflector control elements, safety elements, and fuel element matrix.

The preferred embodiment of the present invention is shown in FIGS. 1 and 2. Referring now to FIG. 1 specifically, the core vessel 20 consists of a 9½-inch diameter stainless steel cylindrical thimble having a wall thickness of 3/32 inch with a top plug assembly 22 and a bottom support structure 24. There are two 1¼-inch coolant line penetrations of the vessel 20, an inlet line 26 at the bottom, and outlet line 28 above the top of the core 30. The bottom support structure 24 consists of cylindrical support 25 welded to the bottom of vessel 20 and integrally attached to base plate 27, which is supported by concrete 29. The base plate 27 and concrete 29 have an aperture through which the inlet line 26 extends. The base plate 27 also supports pivot plate 31 about which the safety elements 32 pivot, and has a bearing assembly 33 in which the control elements 24 rotate. The safety elements 32 are supported in a frame 35 and are fabricated of beryllium. The frame 35 has two removable connecting pins 36 to which are attached a support plate 37 which is pivotally mounted on pivot plate 31. The outer extremity, i.e., scram position, of the pivotal movement of support plate 37 and safety element 32 is shown in the dotted lines in FIG. 1. The outer extremity of support plate 37 has a pivot pin 38 removably supported by extension 39. Pivotally attached to pin 38 is rod 40 of the safety element drive mechanism indicated generally at 41. The rod 40 is attached to connecting tube 42 (shown in its upper position) and has a shoulder 43 to insure positive engagement with tube 42 upon downward movement of tube 42. The tube 42 and rod 40 move longitudinally within a guide tube 44 supported by floor 45. Within the guide tube 44 and also supported by floor 45 is a centering guide 46 so that lateral movement of tube 42 and rod 40 is minimized. The tube 42 is connected to snubber 47 which is supported by electromagnets 48. The upper electromagnet is connected to safety element drive assembly 49 which is mounted upon frame 50 having a base 51 attached to floor 45. Position switches 52 are mounted on frame 50 to detect the position of the lower electromagnet 48 and snubber 47.

The control elements 34 are semicircular and are mounted upon a frame 60 having a tube 61 into which positioning shaft 62 is fixed by pin 63. The shaft 62 is rotatably mounted within bearing assembly 33. A control shaft 64 is pinned to tube 61 as at 63 and extends upwardly into gear box 65 which is mounted on floor 45. The gear box 65 is driven by control drum drive 66. The drive 66 rotates control shaft 64 through gear box 65 to move the control element into and out of proximity to the core 30. Both the control elements (rotatable) and safety elements (pivotal) are reflector controls for the core 30.

Referring now to FIG. 2, the radial orientation and location of the control and safety elements 34 and 32 are apparent. There are three safety elements 32 and three control elements 34 equally spaced around the core vessel 20. The movement of safety elements 32 is along lines of radius of FIG. 2, while the movement of control elements 34 is rotational with shaft 64 as the rotational center.

Figure 3:
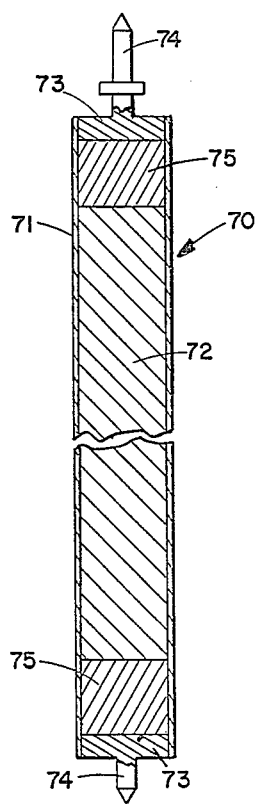
FIG. 3 is a sectional view of a fuel element of the present invention.

Within the core vessel 20 are 61 fuel-moderator elements 70. Each element 70 is a clad 71 (see FIG. 3) 1-inch diameter rod 72 with end caps 73 and grid plate indexing pins 74 located at each end. The fuel moderator material 72 is the hydride of Zr + 7 w/o of 93% enriched uranium alloy. The resultant material contains about $6 \times 10^{22}$ atoms of hydrogen per cm$^3$ (compared to cold water with $6.7 \times 10^{22}$ hydrogen atoms per cm$^3$). The preferred embodiment described here contains 93.12 w/o ZrH$_{1.70}$ and 6.88 w/o uranium. The hydrogen-to-metal ratio is 1.65 and the density is about 5.89. The core fuel moderator material volume is 460 in$^3$ and contains about 375 moles of hydrogen.

The U-235 fuel is alloyed with the zirconium by means of successive arc melting operations or other means well known in the art. The resultant alloy is hydrided to form a massive homogeneous fuel moderator material. Such a homogeneous material is superior to a heterogeneous arrangement in that all fuel and moderator surface is heat transfer area. Also, the moderator dilutes the fuel such that a much higher fraction of fuel atoms can be utilized in the fission process before excessive structural damage results. Homogeneity also provides for a rapid-acting negative temperature coefficinet which is particularly desirable for automatic control.

Figure 4:
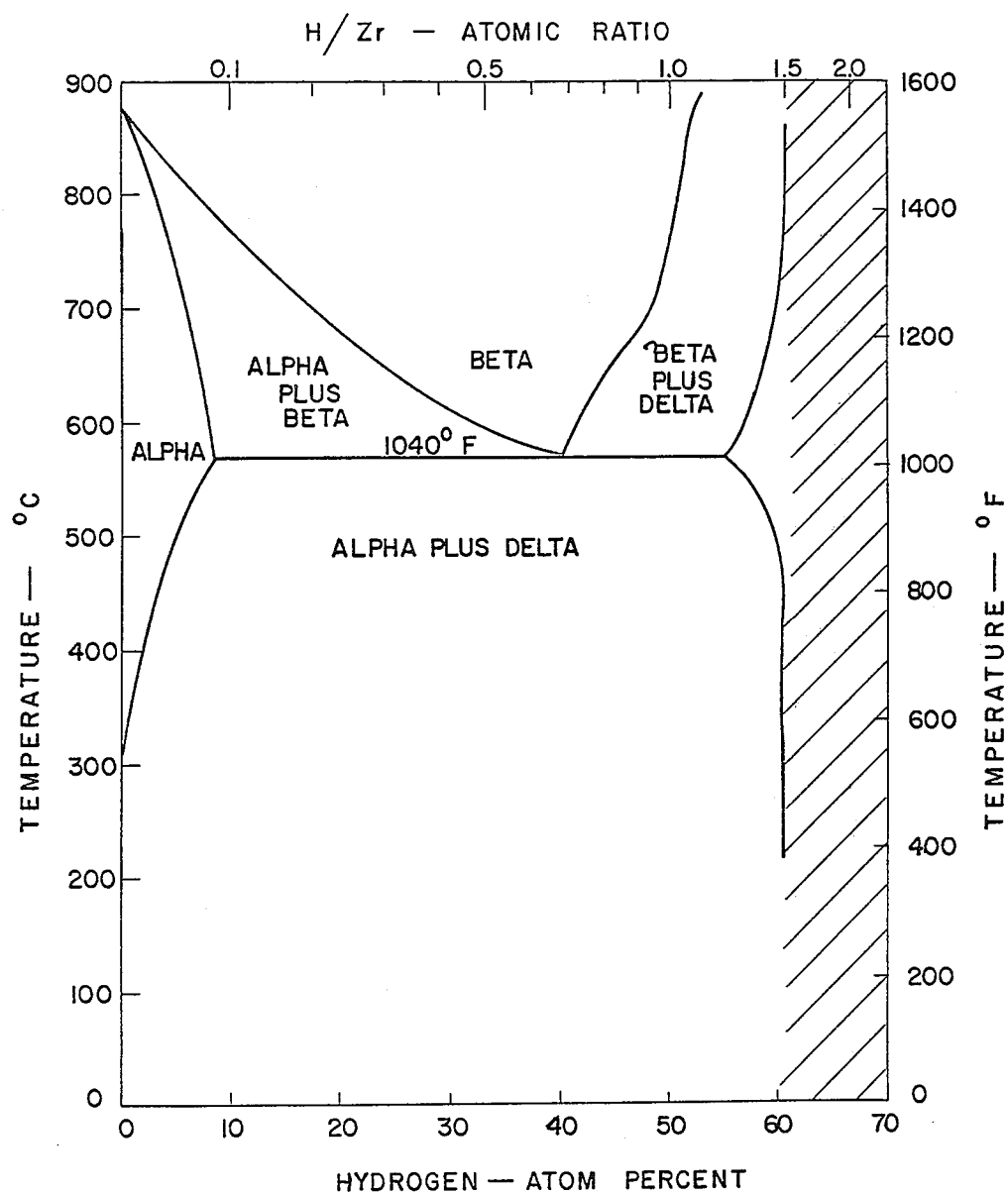
FIG. 4 is a phase diagram for the zirconium hydride system.

While the homogeneous hydrided mixture is not identical in all its characteristics to zirconium hydride, one of the important considerations in the choice of the fuel element material is governed by the zirconium hydride which is present in the fuels used in the reactor of this invention. FIG. 4 shows a phase diagram for the zirconium hydride system. Three well characterized single phases exist. They are: (1) hydrogen dissolved in alpha zirconium (hexagonal close packed); (2) hydrogen dissolved in beta zirconium (body centered cubic); and (3) a delta-hydride phase (tetragonal). It is the latter phase with which the present invention is concerned. Thus the zirconium hydride portion of the fuel must be in the delta phase in order to prevent changes in size and shape ordinarily associated with changes of phase during thermal cycling. Therefore the limits of the zirconium hydride are such that the H/Zr atomic ratio must be greater than about 1.5 or the hydrogen must be present in at least about 60 atomic percent. This puts the fuel on the right side of the phase boundaries separating the delta phase from the alpha-plus-delta and beta-plus-delta, i.e., in the shaded area of FIG. 4. In the delta phase the zirconium hydride does not experience phase changes resulting from thermal cycling.

The uranium, enriched to about 93 percent U-235, is preferably between about 5 and about 15 weight percent of the fuel in order to preserve the epithermal characteristics. Neutron generation time in the epithermal hydride is 10 to 30 microseconds, which is long compared to about 0.01 microseconds in a metallic fast core. The prompt and large negative temperature coefficient, attributable to the homogeneous mixing of fuel and moderator, as well as the epithermal mean fission energy of 0.1 ev results in an easily controlled safe reactor. A uranium content above about 50 weight percent is not considered desirable. However, no specific upper limit may be stated since the core geometry, reflector thickness, and coolant must also be considered for each specific case. Furthermore the lower limit is dictated by fundamental critical mass requirements necessary to sustain a chain reaction. Both of these considerations are matters of skill of the art calculations.

The absence of a solid solution allows one to consider the material as being essentially zirconium hydride containing a small amount of dispersed uranium. The presence of the uranium does not materially affect the thermal properties of the system but does tend to inhibit grain growth.

The fuel moderator material is fabricated into a solid 10-inch-long by 0.980-inch-diameter rod 72. The fuel element is assembled in the preferred embodiment by canning the fuel moderator rod 72 is a 1-inch O.C. 10 mil wall Type 347 stainless steel tube 71 with a 1½-inch-long, 0.975-inch-diameter beryllium slug section 75 placed at each end. The inside surface of the tube 71 is coated with a 2 to 3 mil layer of a boron-free ceramic coating. The element is then sealed with end caps 73 which are welded to cladding tube 71.

The above-described elements are placed in spaced relation in a hexagonal array 76 on triangular centers, 1.015 inches apart, as shown in FIG. 2. The resulting reactor core is a hexagonal right cylinder about 8 inches across the flats and 9 inches across corners with a 10-inch height. The volume between the hexagonal array 76 and the vessel 20 is filled with a filler 77 of beryllium. The interstices 78 between elements 70 are filled with a liquid metal coolant, sodium or preferably NaK in the preferred embodiment. The fuel-moderator elements 70 are supported in the core 30 in spaced relation by perforated bottom grid plate 80 and top grid plate 81. The bottom grid plate 80 is attached to flanges 82 welded to the wall of vessel 20. The top grid plate 81 is prevented elements are in operating position controller 128 is activated to control the reactor during operation. Controller 128 monitors the neutron flux through 130, and actuates the fine control through control drums 34. Controller 128 obtains information on the reactor core inlet coolant temperature at 130 and the boiler superheater output temperature at 132. In this manner the drums 34 can be activated to control the reactivity of the core and the resulting temperatures at 130 and 132. The pressure regulator 134 is actuated by controller 136 which monitors the pressure in the turbine inlet pipe and regulates the Hg pressure in the boiler superheater return line. The throttle valve 138 is controlled by controller 140 which is responsive to the load 141 on the generator 105. In this manner the load 141 controls the throttle valve 138 to vary the turbine input. Any change in throttle valve 138 will affect the pressure in the mercury heat exchanger system under the control of controller 136, and the temperature changes in the mercury resulting from a change in load will result through 132 in action by controller 128 to compensate by the movement of drum 34 to bring the system into proper equilibrium.

The preferred operating conditions for the above-described reactor system are shown in Table II.

TABLE II

SYSTEM SPECIFICATIONS OF PREFERRED EMBODIMENT

| | |
|---|---|
| Net electrical output power | 3 kwe |
| Reactor thermal power | 50 kwt |
| Electrical frequency | 2000 cps |
| Voltage | 100 |
| Radiation area | 110 ft$^2$ |
| Cycle conditions | |
| Reactor outlet temperature | 1200° F |
| Reactor inlet temperature | 1000° F |
| Mercury superheat temperature | 1150° F |
| Mercury boiling pressure | 110 psia |
| Mercury boiling temperature | 924° F |
| Mercury turbine exhaust temperature | 600° F |
| Mercury turbine exhaust pressure | 6.8 psia |
| Radiation temperature | 580° F |
| NaK-78 flow rate | 61.3 lb/min |
| Mercury flow rate | 17.4 lb/min |
| Reactor heat loss | 5 kwt |
| Parasitic load | 0.300 kwe |
| Control power requirements | 0.100 kwe |
| Rankine cycle efficiency | 0.22 |
| Subcooling | 200° F |
| Component performance | |
| NaK pump developed pressure | 2 psi |
| NaK pump power | 0.44 kw |
| Mercury pump developed pressure | 214 psi |
| Mercury pump power | 0.15 kw |
| Alternator efficiency | 80% |
| Turbine output power | 544 kw |
| Turbine pressure ratio | 16.1 |
| Total weight of system, including shielding and power conversion system | 900 lbs. |

Figure 9:
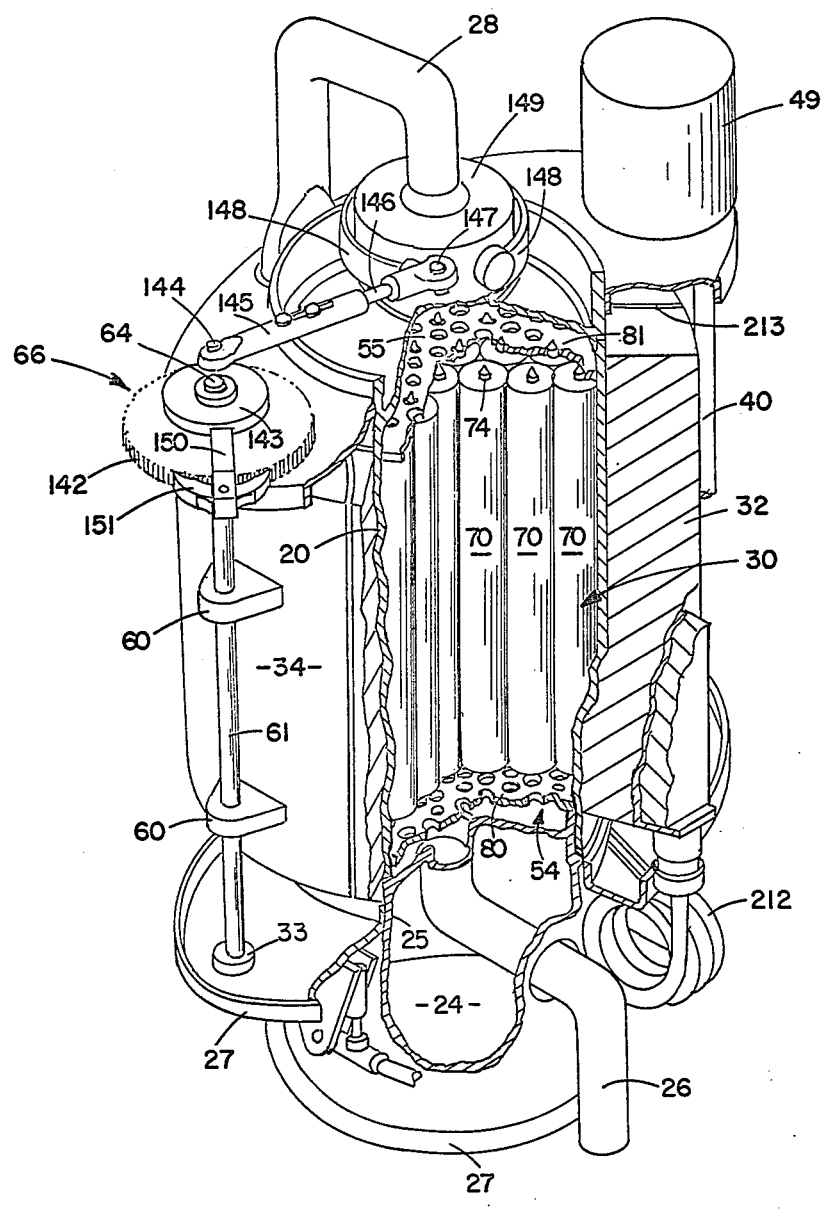
FIG. 9 is a partially sectioned perspective view of a second embodiment of the present invention.

FIG. 9 shown a perspective view of a modified reactor of the present invention. This embodiment is essentially the same as the preferred embodiment except the control drum drive 66 is a thermomechanical control. The shaft 61 to which the drum 34 is attached has a gear 142 attached thereto and a disk 143 journaled on one end. The disk 143 carries a radially displaced pivot 144 on which an arm 145 is rotatably connected. The arm 145 carries a spring biased telescoping rod 146 which has one end pivotally connected at 147 to one end of a temperature responsive element 148. The other end of element 148 is fixed to the outlet plenum cover 149. In this manner the element 148 expands or contracts in accordance with the temperature of the NaK coolant in the outlet plenum 55. Thus if the temperature of the NaK increases, the element 148 expands causing arm 146 to urge pivot 144 to turn with respect to shaft 64, thereby turning disk 143. The disk 143 has an arm 150 to which is pivotally attached a ratchet mechanism 151 which will move the gear 142 so that the drum 34 is rotated to reduce the reactivity and thus the temperature of the core 30. The fuel element and operating characteristics are essentially identical to those of the preferred embodiment. This embodiment of the invention has a spring 212 which moves the reflector element 32 away from core 30. Under ordinary operating conditions the spring 212 and reflector 32 are in the position shown in FIG. 9. The segmented reflector 32 is held in position against the core 30 by fusible links 213. This arrangement is provided so that upon re-entry of the missile carrying such a reactor as a power source the heat created upon re-entry will melt the links 213 thereby allowing the core to be exposed to the re-entry heat so that it will burn up. The reflector of Be would insulate the core from the re-entry heat and the core could, at least in part, remain intact until hitting the earth's surface, thereby creating a potential radiation hazard. By providing the fusible link arrangement, the core would be destroyed before reaching the earth's surface.

In all of the embodiments shown and described herein, the bare core, i.e., without the various reflectors, is a subcritical assembly. Only after the reflector elements are in their proper position will a condition of criticality be reached. Thus the core can be handled for transportation without the danger of a chain reaction. In this manner replacement, testing, etc., are greatly facilitated and radiation dangers drastically reduced.

While reflector and drum control have been specifically mentioned herein, it is within the purview of the present invention to utilize burnable poisons, i.e., boron, samarium, as supplements to or substitutions for the disclosed control systems.

Although a particular embodiment of the present invention has been described, various modifications will be apparent to those skilled in the art. Therefore, the present invention is not limited to the specific embodiment disclosed but only by the appended claims.

What is claimed is:

1. A nuclear reactor comprising a vessel, a core within said vessel, means in said core for producing an epithermal neutron energy spectrum, said means including a liquid metal coolant and a plurality of fuel elements, each of said fuel elements containing zirconium hydride and a fissionable material mixture, said zirconium hydride being in the delta phase.

2. The nuclear reactor of claim 1 wherein said delta phase zirconium hydride has a hydrogen-to-zirconium ratio of at least 1.5 but less than 2.0 and an operating temperature of between about 1,000° F. and about 1,400° F.

3. The nuclear reactor of claim 1 including means for controlling the reactivity of said core responsive to said coolant temperature and means for shutting down said reactor including at least one movable reflector.

4. A nuclear reactor comprising a vessel, a core within said vessel, means for passing a liquid metal coolant through said core, means for producing an epithermal neutron energy spectrum in said core including said coolant, said means including a plurality of fuel elements in said core containing a zirconium hydride and enriched uranium mixture, said zirconium hydride being in the delta phase and having a hydrogen-to-zirconium ratio of at least about 1.5, a beryllium reflector from upward movement after assembly by lugs 83 extending downward from the top plug assembly 22.

Figure 5:
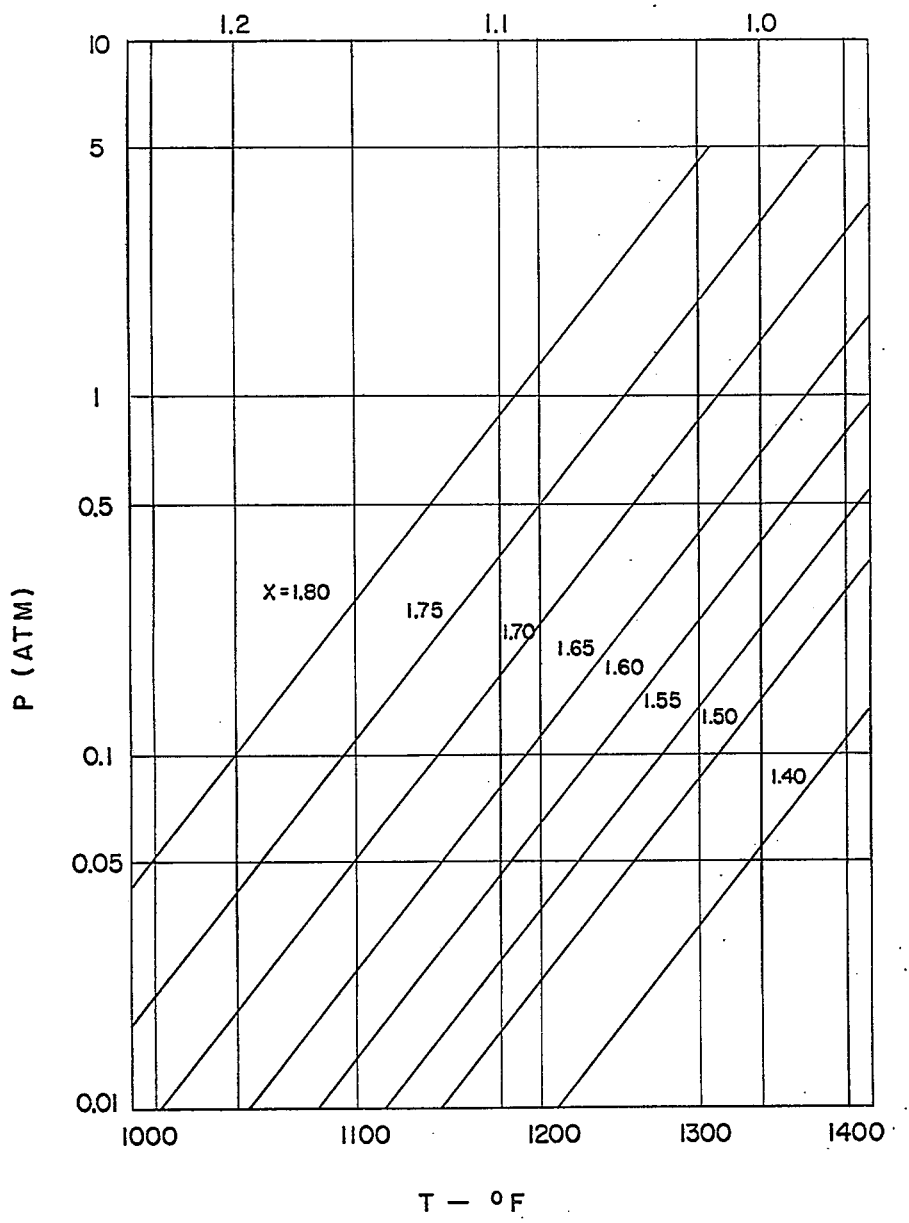
FIG. 5 is a graph of the dissociation pressures for the preferred fuels.
Figure 6:
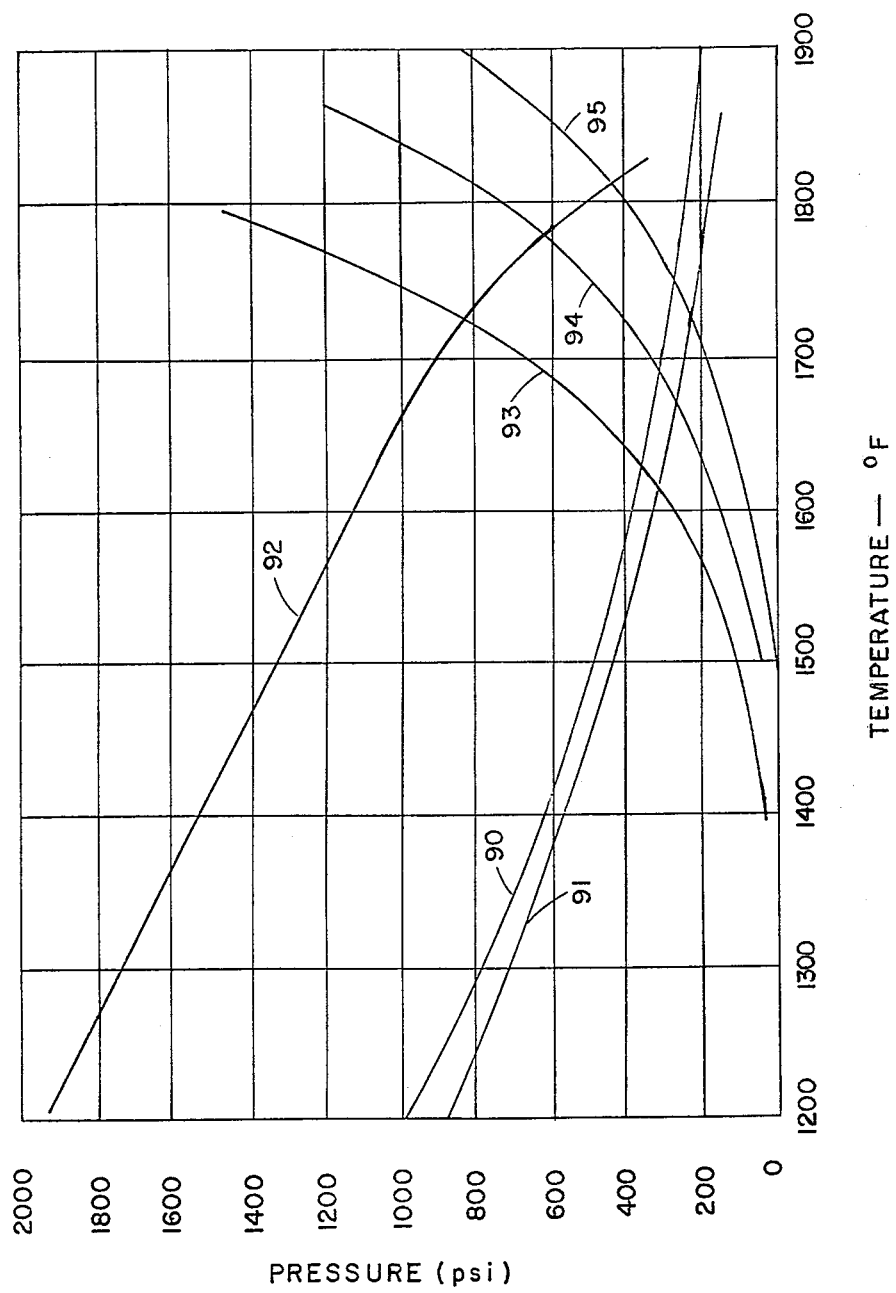
FIG. 6 is a graph of the pressure vs hydrogen-to-metal ratio and pressure cladding.

The most significant property from the hazard viewpoint of fuel moderator material is that the dissociation pressure of the zirconium hydride is a function of temperature. Dissociation pressure data for a hydride of Zr + 10 w/o uranium is shown in FIG. 5. In this figure a graph is shown of the dissociation pressure for hydrided zirconium with 10 w/o uranium alloy as a function of pressure for various values "$x$" where $x$ is the ratio of gram atoms H/gram atoms total metal. It is apparent that at the preferred coolant outlet temperature of between 1,000° and 1,400° F. less than five atmospheres of pressure is generated. FIG. 6, based on FIG. 5, shows the dissociation pressure vs hydrogen-to-metal atomic ratio and pressure cladding rupture vs temperature for several materials. The dissociation pressure at the anticipated peak core operating temperature of 1,300° F. will be about 6 psia. In FIG. 6 the pressure to rupture Type 347 stainless steel is shown on curve 90 and Type 304 stainless steel is shown on curve 91. The curve 92 shows the cladding rupture pressure required for "Hastelloy B." Curves 93, 94, and 95 show the dissociation pressures for the hydrogen-to-metal ratios of 1.70, 1.65, and 1.60, respectively. As is apparent from FIGS. 5 and 6, the important safety ramification of this material instability is that a nuclear excursion or other accident that causes overheating of the fuel-moderator material would cause a corresponding increase in dissociation pressure which could rupture the fuel cladding. Another result of this material instability is the loss of hydrogen from the core by diffusion through the ceramic-coated cladding. While the latter instability is relatively minor as pointed out hereinafter, it does constitute an operational disadvantage, since it requires excess reactivity to compensate for the hydrogen loss during the lifetime of the reactor. The former is an ultimate reactor shutdown mechanism and, therefore, is not a limiting factor for a closed system.

The diffusion of hydrogen out of the fuel moderator element using, for example, "Hastelloy B" and the above-mentioned ceramic coating would be less than 0.2% per month and is reflected as a rate of change in reactivity of a negative 0.1% per month. If the fuel moderator elements are unclad, the hydrogen loss rate is determined by the hydrogen diffusion rate in zirconium hydride. The energy necessary to decompose $ZrH_2$ into $Zr + H_2$ is about 40 k cal/mole. Since the core contains a total of about 375 moles of $H_2$, the energy required for total decomposition of the core zirconium hydride is $15 \times 10^6$ calories or about 62.7 Mw/sec of energy, thus indicating the upper limit of energy release.

The core vessel 20 is surrounded by about 3 inches of beryllium which forms the radial reflector (see FIG. 2). Small sections 77 of beryllium are internal to the core vessel and fill the volume between the inscribed hexagonal cluster of fuel rods 70 and the cylindrical core vessel 20. The beryllium external to the core consists essentially of three parts. Plates 53, ¼-inch thick stacked along three flat surfaces make up the removable sections 32 for the three safety elements. Partial circular cross sections which can be rotated away from the core make up the control drums 34. A specially shaped piece fills the interstices between the sections above the reactor core vessel. The length of the beryllium reflector is 13 inches and end reflection is achieved with the beryllium slugs 75 and end caps 73 which are integral parts of the fuel moderator element 70, as well as the NaK coolant inlet plenum 54 and outlet plenum 55.

The reactor is controlled by changing the effectiveness of the reflector for maintaining neutron economy in the core. This is achieved by rotating external portions 34 of the radial reflector away from the core. Each control drum 34 is worth about 3% in reactivity. Each element is driven with a direct drive 66 geared as at 65 to provide a maximum reactivity insertion rate of 0.015% per sec.

Safety shutdown of the reactor is achieved in a failsafe manner, by moving portions 32 of the radial reflector away from the reactor core. The three safety elements are each worth about 5% in reactivity. The movement of the elements is accomplished by allowing the portions 32 to fall under gravity away from the core, pivoting about a pivot on plate 31. Each safety element 32 is moved into position adjacent the core by means of a drive assembly 49 attached by a magnet 48 to the pull-up rod 40. The motion is such that the reactivity insertion rate is limited to a maximum of about 0.051% reactivity per sec. The safety elements are scrammed by interrupting power to the magnet 48.

The core is cooled in the preferred embodiment by NaK flowing through inlet 26, inlet plenum 54, the interstices 78 between fuel moderator elements 70, into outlet plenum 55 and out through outlet line 28. The heat may then be extracted or used in any conventional manner, i.e., power production and/or space heating.

Figure 7:
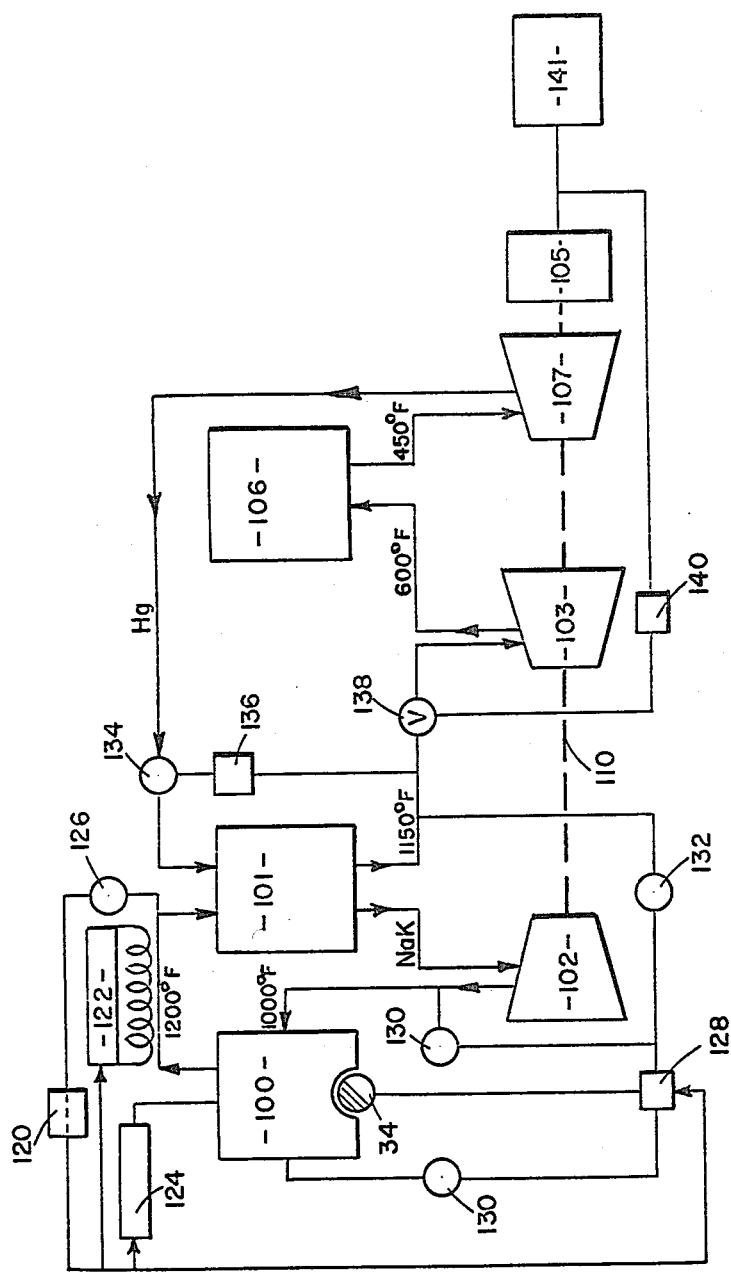
FIG. 7 is a schematic of the control and heat removal system.

A flow schematic shown in FIG. 7 shows one system for extracting the heat and converting it to electrical energy.

The reactor 100 has a coolant outlet temperature of 1,200° F. The NaK coolant is passed through one side of a boiler superheater 101 to a NaK pump 102 which pumps the NaK, now at the reduced temperature of 1,000° F. back through the reactor 100. The boiler superheater 101 has its other side connected to a mercury heat removal system which consists of a turbine 103 connected by shaft 110 to an alternator 105. The mercury temperature is reduced from 1,150° F. on the inlet side to 600° F. on the outlet side. The outlet side is connected through a condenser radiator 106 to a mercury pump 107 which pumps the mercury through the secondary heat removal systems. The heat dissipated by condenser radiator 106 may be ejected into space or, in the case of land-based power supply, used for space heating or similar uses.

Figure 8:
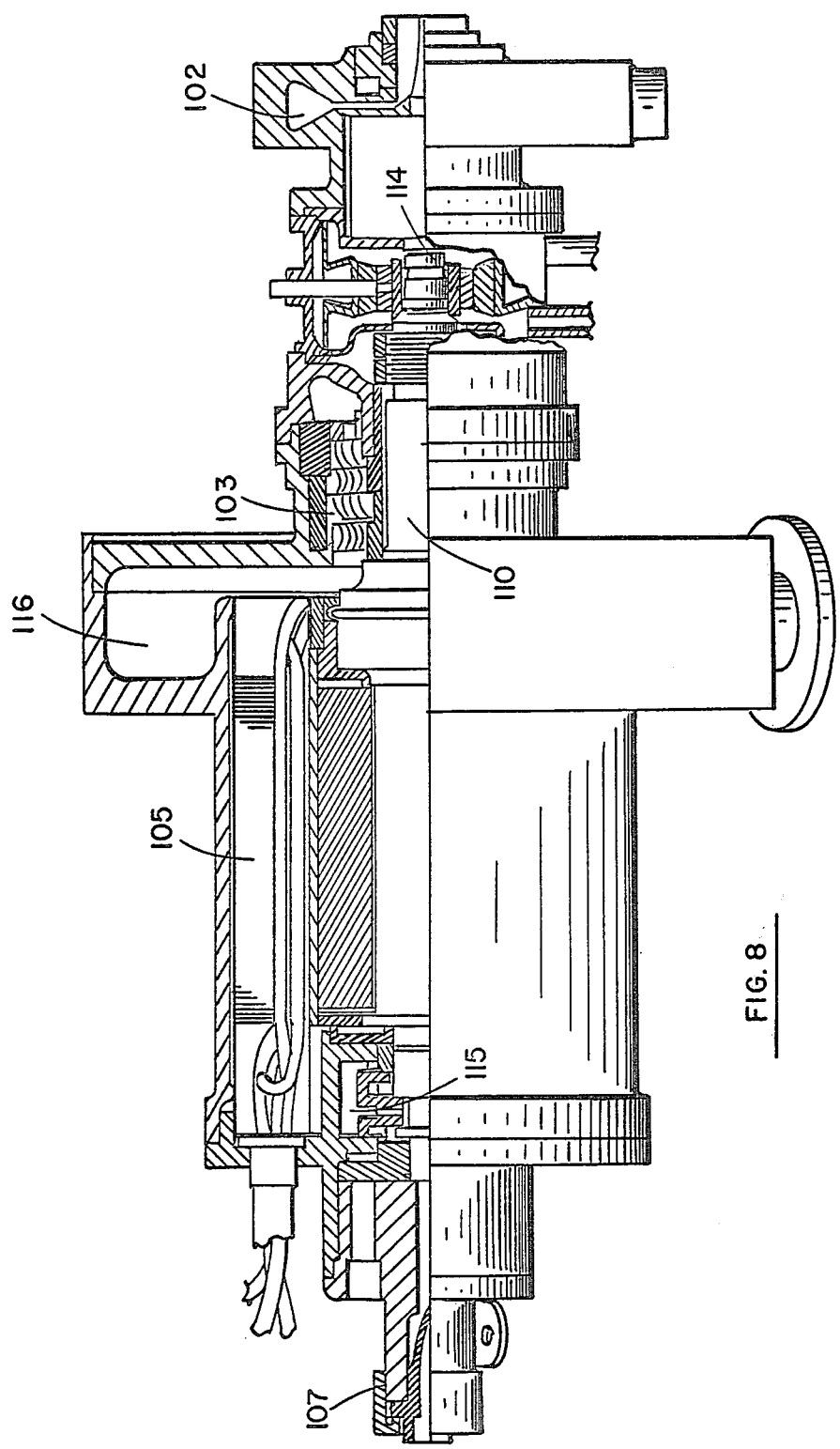
FIG. 8 is a partially sectioned view of the combined rotating unit.

A combined rotating unit (see FIG. 8) is utilized in the present invention to minimize space and weight requirements. The rotating unit has a common shaft 110 to which is connected the mercury pump 107, the NaK pump 102, and turbine 103. The shaft 110 is supported by a sleeve bearing 114 and a sleeve and thrust bearing 115. The turbine 103 has an exhaust 116 and drives an alternator 105 which generates 110 volts at 2,000 cps.

FIG. 7 also shows the control schematic for the reactor system of the present invention where unattended operation is required.

A controller 120 is connected to an electrical heat source 122 and reflector actuator 124. The source 122 heats the NaK prior to startup to a temperature above its melting point, the temperature being monitored by monitor 126 which provides the information to controller 120. The reflector actuator 124 moves the reflector elements 32 into position against the core for startup. Actuator 124 cannot be energized until the temperature of the NaK is above its melting point. After the reflector surrounding said core and movable with respect to said core, means for moving said reflector to control the reactivity of said core, control means in said reflector and means for rotating said control means to effectuate fine control of the reactivity of said core.

5. The nuclear reactor of claim 1 including safety means having at least one pivotally mounted movable reflector element, and means for pivoting said reflector element away from said vessel.

6. The nuclear reactor of claim 1 including safety means having a plurality of reflector elements pivotally mounted at the bottom of said reactor vessel and means for pivoting said elements radially away from said vessel, control means rotatably mounted between said reflector elements, and means for rotating said elements about an axis parallel to said fuel elements.

7. The nuclear reactor of claim 6 wherein said means for rotating said control elements includes means responsive to the temperature of said liquid metal coolant.

8. A nuclear reactor comprising a vessel, a core within said vessel, means in said core for producing an epithermal neutron energy spectrum, said means including a liquid metal coolant and a plurality of fuel elements, each of said fuel elements containing zirconium hydride and a fissionable fuel, said zirconium hydride having a hydrogen-to-zirconium ratio of at least 1.5 but less than 2.0 and an operating temperature between about 1000° F. and 1400° F., means for passing said coolant through said core and out of said vessel, and means responsive to the temperature of said coolant leaving said vessel for controlling the reactivity of said core.

* * * * *